(12) United States Patent
Trakas

(10) Patent No.: US 7,775,789 B2
(45) Date of Patent: Aug. 17, 2010

(54) SPRUE BAR SHUTOFF DEVICE

(76) Inventor: Panos Trakas, 3803 E. Illinois Ave., St. Charles, IL (US) 60174

( * ) Notice: Subject to any disclaimer, the term of this patent is extended or adjusted under 35 U.S.C. 154(b) by 0 days.

(21) Appl. No.: 12/343,064

(22) Filed: Dec. 23, 2008

(65) Prior Publication Data

US 2010/0155995 A1    Jun. 24, 2010

(51) Int. Cl.
*B29C 45/46* (2006.01)

(52) U.S. Cl. ..................................................... 425/567

(58) Field of Classification Search ................. 425/562, 425/563, 564, 565, 566, 567
See application file for complete search history.

(56) References Cited

U.S. PATENT DOCUMENTS

| | | | |
|---|---|---|---|
| 5,458,843 A | 10/1995 | Brown et al. | |
| 5,494,254 A | 2/1996 | Dominka | |
| 5,968,562 A | 10/1999 | Schad et al. | |
| 6,793,480 B2 * | 9/2004 | Dominka | 425/563 |
| 7,165,968 B2 * | 1/2007 | Serniuck | 425/573 |
| 7,357,172 B2 | 4/2008 | Teng et al. | |
| 7,393,198 B2 | 7/2008 | Niewels et al. | |
| 7,393,479 B2 | 7/2008 | Mai | |
| 7,427,197 B2 | 9/2008 | Ciccone et al. | |
| RE41,280 E | 4/2010 | Trakas | |
| 2006/0003038 A1 | 1/2006 | Serniuck | |

OTHER PUBLICATIONS

Plastic Process Equipment, Inc., 6 Stock Screw Tip Styles, downloaded from www.ppe.com/09cat/0852-0853.pdf on Jan. 30, 2009.

* cited by examiner

*Primary Examiner*—Tim Heitbrink
(74) *Attorney, Agent, or Firm*—Momkus McCluskey, LLC; Jefferson Perkins; Steven P. Behnken

(57) ABSTRACT

An injection molding shutoff assembly that includes a chamber containing a movable body movable between rear and forward positions. In the rear position, the movable body provides a seal and prevents flow of molten plastic out the chamber inlet, called drool. When the movable body is in the forward position, one or more passages permit flow of the molten plastic around the movable body and to an exit in the chamber, leading to one or more molds. In an alternate embodiment, the apparatus also includes an elongate stem that maintains the movable body in the forward position allowing the injection molding system to decompress, thereby eliminating drool and decreasing downtime.

24 Claims, 6 Drawing Sheets

SPRUE BAR SHUTOFF DEVICE

BACKGROUND OF THE INVENTION

The present invention relates to injection molding machines, and in particular, a shutoff device for use in a system that transports molten polymer from the molding machine to at least one stack mold by way of a sprue bar.

It is known to provide stack molds in injection molding machines in which there are at least two sets of molding chambers which divide along separate parting lines. One method of delivering molten polymer to all of the molding chambers in a stack mold is by a sprue bar. A sprue bar extends from a sprue of the molding machine, along the axis of the stack mold assembly, to a central manifold located between at least two mold plates in the stack. A plurality of nozzles in turn provide conduits for the molten polymer from the manifold to each of the molding cavities, with some of the nozzles extending forward in an axial direction to those mold cavities which are forward of the manifold, and the rest of the nozzles extending rearward in an opposite axial direction to those mold cavities which are rearward of the manifold. A representative sprue bar-equipped stack mold is illustrated in FIG. 2 of U.S. Pat. No. 7,427,197 to Ciccone et al.

After the molten polymer has been injected under pressure into the molding chambers, the system is depressurized, the cavities are cooled, the plates forming the molding chambers are separated, and the molded piece or pieces are ejected. During this process it is necessary to disconnect the sprue from the sprue bar. Upon disconnection, molten polymer or "drool" will often be produced from the orifice of the sprue bar, resulting in the loss of raw material and additional cleanup costs. If enough molten polymer drools from the sprue bar, it may solidify and prevent complete closure of the mold, causing damage to the equipment, expensive repairs, and lost production. At the very least, this drooling effect requires removal by a technician, increasing the time between cycles. Thus, it would be desirable to provide a sprue bar shutoff device that reduces the amount of drool or prevents it completely.

SUMMARY OF THE INVENTION

The present invention provides, among other things, an improved sprue bar shutoff device that reduces or eliminates drool. According to one aspect of the invention, the shutoff device includes an exterior seat that is sealable to a nozzle of an injection molding machine that is spaced from the assembly when not engaged. The assembly also includes a first opening that provides fluid communication from the exterior seat to a chamber having an entry wall and a first sealing surface surrounding the first opening. The assembly also includes a movable body that is reciprocally movable within the chamber from a rear position proximate to the entry wall to a forward position remote from the entry wall. The movable body has a second sealing surface that seals with the first sealing surface in the entry wall when in the rear position.

The chamber includes an exit wall with a second opening providing fluid communication with at least one receiving unit such as a sprue bar. An elongated stem of the injection molding machine nozzle may be inserted through the first opening at or after the time of connecting the injection molding machine to the shutoff assembly. The forward end of the elongate stem contacts the movable body, preventing the movable body from moving to the rear position.

One or more passages of the chamber extend from the entry wall to the exit wall and transport molten polymer from the first opening to the second opening when the movable body is in the forward position. The movable body moves to the rear position when the stem is withdrawn from the first opening, which allows the first and second sealing surfaces to contact each other, thereby closing the first opening and reducing or preventing drool. Preferably, the movable body is pushed to the rear position by the molten polymer downstream of the movable body.

According to another aspect of the invention, an injection mold shutoff assembly includes an exterior seat that is sealable to a nozzle of an injection molding machine which is spaced from the assembly when not engaged. The assembly also includes a first opening that provides fluid communication from the exterior seat to a chamber having an entry wall and a first sealing surface surrounding the first opening. As above, a movable body is reciprocally movable within the chamber from a rear position proximate to the entry wall to a forward position remote from the entry wall. The movable body has a second sealing surface that seals with the first sealing surface in the entry wall when in the rear position.

Additionally, the chamber has an exit wall with a second opening providing fluid communication with at least one mold. One or more passages of the chamber extend from the entry wall to the exit wall and transport molten polymer from the first opening to the second opening when the movable body is in the forward position. The movable body moves to the rear position when the molding machine nozzle is in a nonengaged position, since it is being pushed by molten polymer downstream of the movable body which allows the first and second sealing surfaces to contact each other, thereby closing the first opening.

In another aspect of the invention, a method for connecting and disconnecting an injection molding machine to and from a shutoff assembly includes the steps of mating a nozzle of the injection molding machine to a seat in an exterior wall of a chamber of the shutoff assembly. The seat is in fluid communication with the chamber through a first opening extending from the exterior wall to an interior entry wall of the chamber. The interior entry wall has a first sealing surface around the first opening.

An elongate stem of the nozzle is advanced through the first opening into the chamber. Molten polymer then flows through the first opening, to a second opening in an interior exit wall of the chamber, and then to at least one receiving device such as a sprue bar.

The injection molding system is then decompressed by stopping the flow of the molten polymer through the first opening. The stem prevents the movable body from reaching a rear position where a second sealing surface of the movable body seals to the first sealing surface. Instead, the movable body is maintained in a forward position where the first and second sealing surfaces are spaced from each other and molten polymer is allowed to flow from the second opening, around the movable body, and through the first opening into the injection molding nozzle 200.

The injection molding machine is disconnected from the assembly by withdrawing the stem of the nozzle from the chamber through the first opening. If there is any pressure left in the system, molten polymer downstream of the movable body will push the second sealing surface of the movable body into sealing engagement with the first sealing surface of the interior entry wall. The nozzle is then disconnected from the seat in the exterior wall of the chamber.

BRIEF DESCRIPTION OF THE DRAWINGS

Further aspects of the invention and their advantages can be discerned in the following detailed description, in which like characters denote like parts and in which.

DETAILED DESCRIPTION

Figure 1:
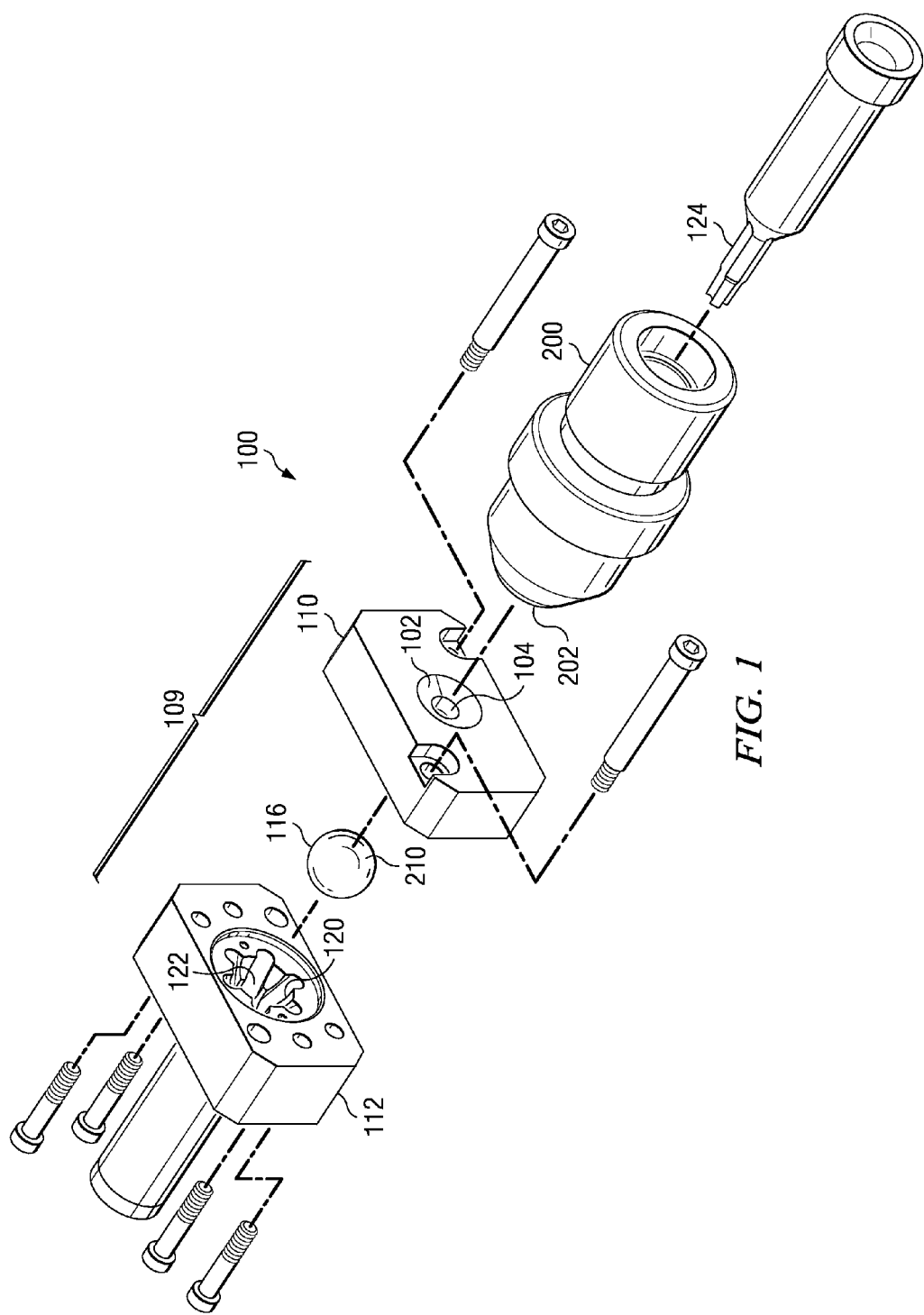
FIG. 1 is an exploded isometric view of a sprue bar shutoff device according to the invention.
Figure 2:
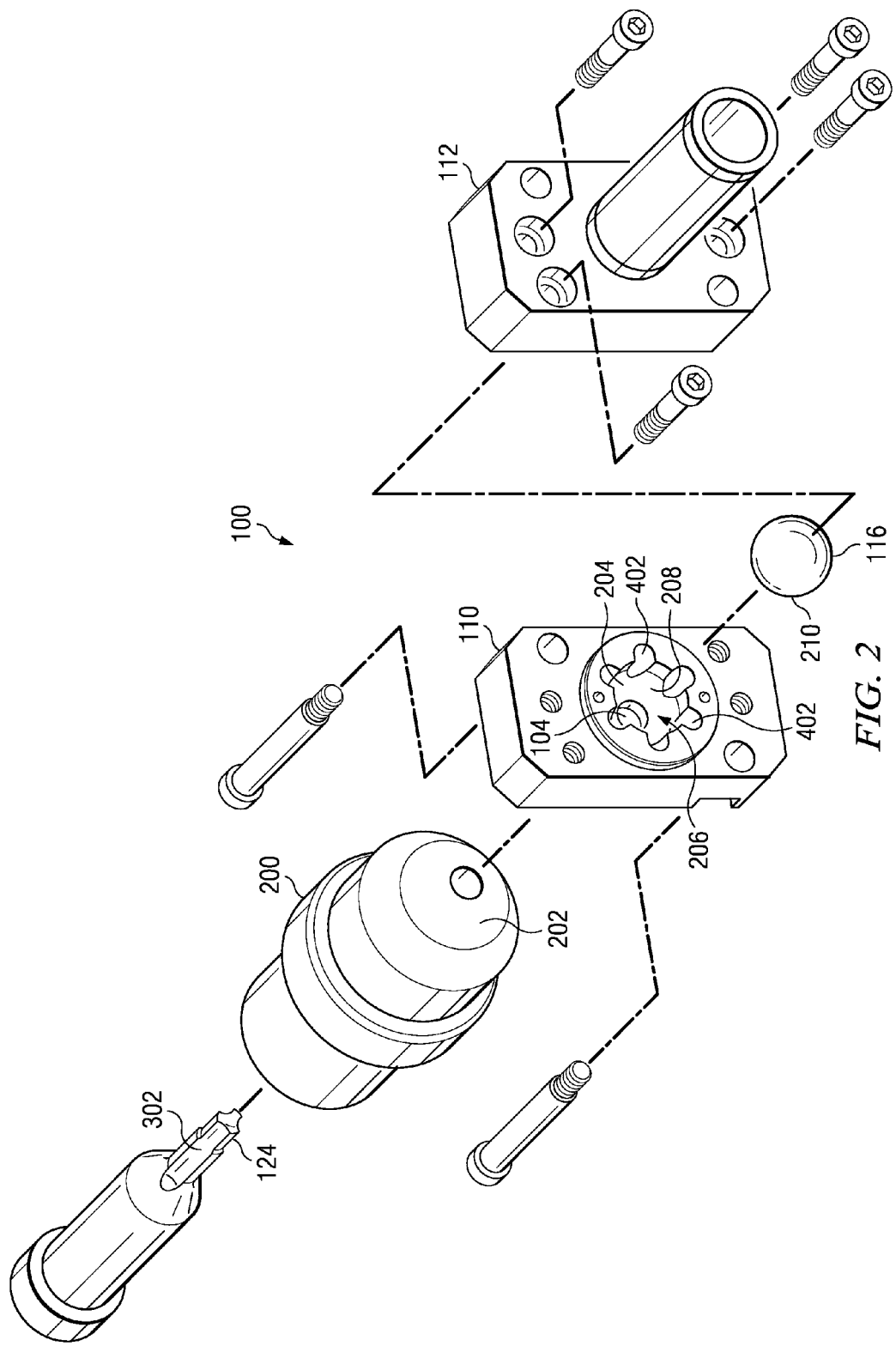
FIG. 2 is an exploded rear isometric view of the assembly shown in FIG. 1.

Referring to FIGS. 1 and 2, in a first embodiment of the invention, an injection mold shutoff apparatus, indicated generally at 100, includes an exterior seat 102 sealable to a front mating surface 202 of an injection molding machine nozzle 200 that is spaced from the assembly when not engaged. A first opening 104 in an entry wall 204 of a chamber 206 provides fluid communication from the exterior seat 102 of the assembly piece 110 to the chamber 206 in assembly block 109, which is preferably formed by mating two assembly block halves 110 and 112. The entry wall 204 has a first sealing surface 208 surrounding the first opening and the chamber 104 includes a movable body 116 that can move within the chamber between a rear position proximate to the entry wall and a forward position remote from the entry wall. See FIGS. 4 and 5, respectively. Preferably, the flow of the molten polymer is sufficient to change the position of the movable body 116.

Additionally, the movable body 116 has a second sealing surface 210 that seals with the first sealing surface 208 of the entry wall 204 when in the rear position. The movable body 116 may be selected to be of any shape capable of sealing with the first sealing surface of the entry wall including, but not limited to, an ellipsoid, a sphere, or a wedge. The shapes of the first and second sealing surfaces should be complimentary.

The chamber also has an exit wall 120 with a second opening 122 that provides fluid communication with a receiving unit such as a sprue bar.

Figure 5:
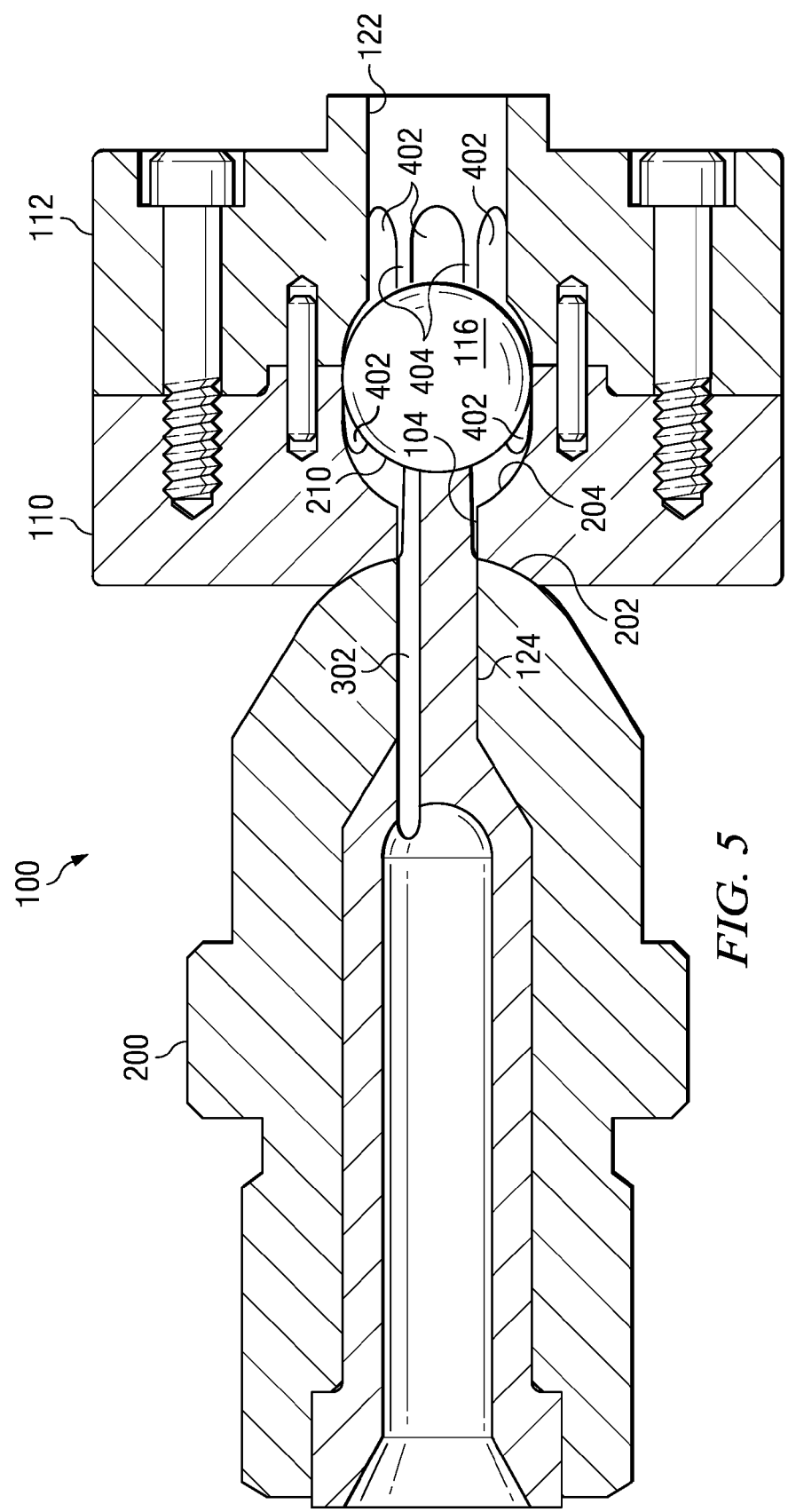
FIG. 5 is an axial sectional view of the sprue bar assembly shown in FIG. 1, with a movable body or ball in a forward position.

An elongated stem 124 may be fixed relative to the rest of nozzle 200 or, in an alternative embodiment (not shown), may be refracted into and extended from the rest of the nozzle 200 during a process of disconnecting from, or connecting to, the assembly block 109. As shown in FIG. 5, the elongated stem 124 is advanced through the first opening 104 at the time of connecting the injection mold machine nozzle 200 to the shutoff assembly block 109. Alternatively, an articulated elongated stem (not shown) may be advanced from a refracted position in nozzle 200 through the first opening 104 after the nozzle front surface 202 is sealed to the exterior seat 102. While it is not required that the stem push the movable body 116 from the rear position to the forward position, it is contemplated that the stem can do so.

Figure 3:
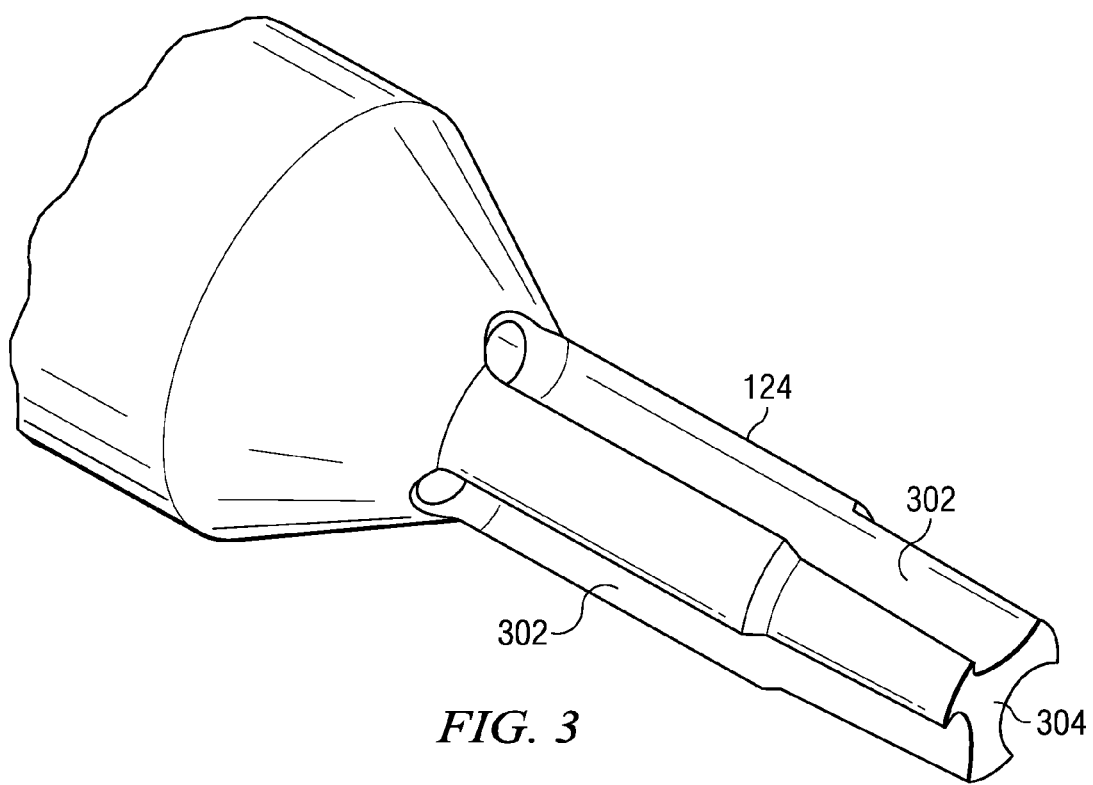
FIG. 3 is a partial isometric view of a nozzle stem according to the invention.

Referring to FIG. 3, the elongated stem 124 preferably includes at least one channel 302 that permits flow of the polymer through the nozzle 200 and into the chamber 206 and even more preferably has a plurality of such channels (such as three) distributed around and parallel to the nozzle axis. Alternatively, the molten polymer may flow around the stem into the chamber. The stem also includes a preferably concave forward end 304 that contacts the movable body 116 when inserted through the first opening to prevent it from moving back to the rear position when under pressure by the molten polymer.

Figure 4:
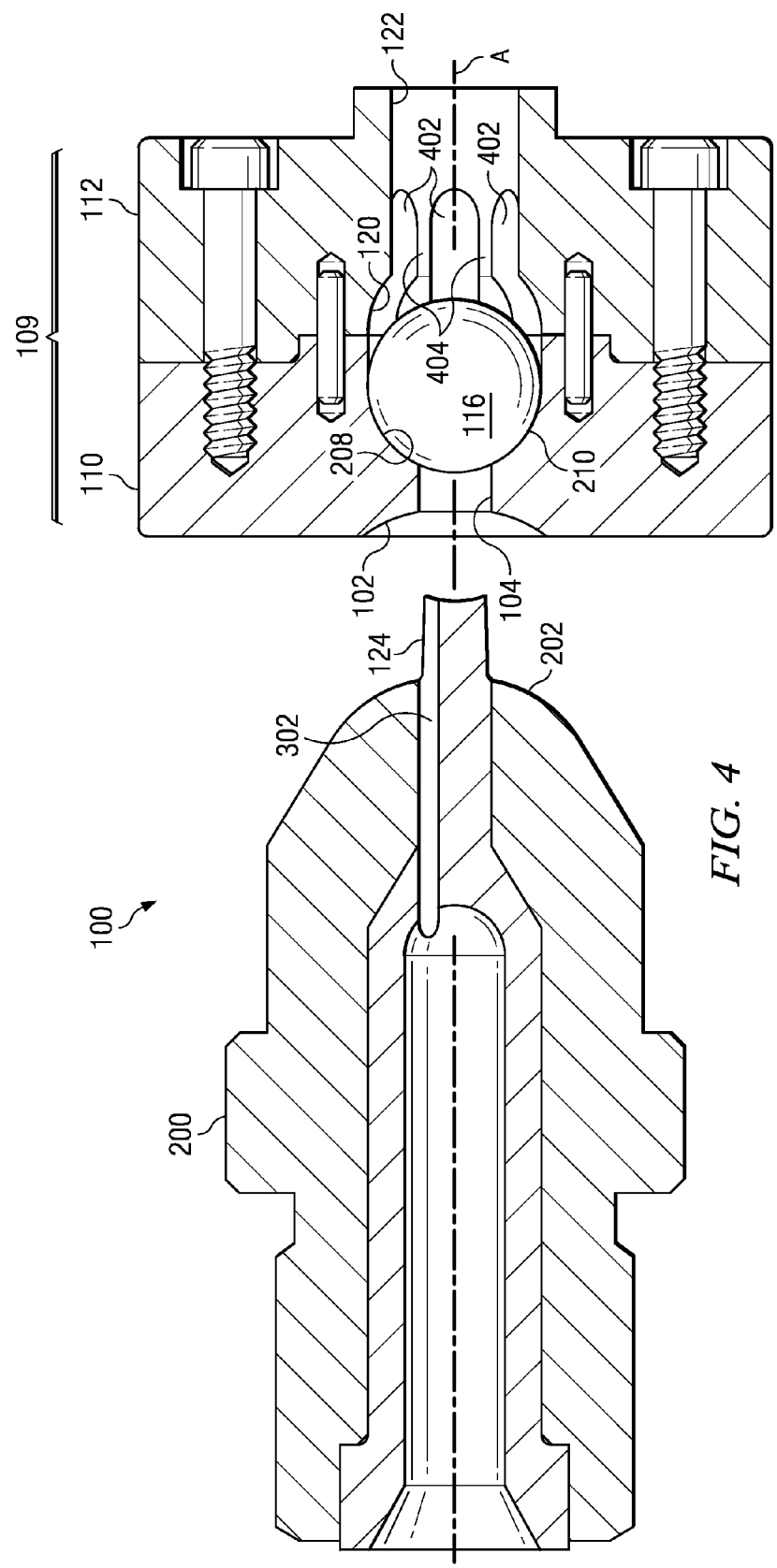
FIG. 4 is an axial sectional view of the sprue bar assembly shown in FIG. 1, with a movable body or ball in a rear position.

Referring to FIGS. 4 and 5, one or more passages 402 of the chamber formed into the halves 110 and 112 extend from the entry wall 204 to the exit wall 120. This provides fluid communication between the first opening 104 and the second opening 122, thereby transporting molten polymer when the movable body 116 is in the forward position. The passages 402 are sealed by the movable body 116 when the movable body 116 is in the rear position.

The chamber may further include a plurality of ridges 404 in the chamber that extend from the entry wall 204 to the exit wall 120 so as to constrain the movement of the movable body along a path of motion, preferably a straight, axial path. More preferably, the passages 402 and ridges 404 are placed circumferentially around an axis defined by the path of motion and the passages are spaced from each other by the ridges.

When the stem 124 is withdrawn from the first opening 104, the movable body 116 moves to the rear position, allowing the first and second sealing surfaces 208, 210 to contact each other, thereby closing the first opening 104. In a preferred embodiment, the movable body 116 is pushed to the rear position by the molten polymer downstream of the movable body 116 and no spring, incline, or decline is used to bias the movable body 116 to either the forward of rear position.

Figure 6:
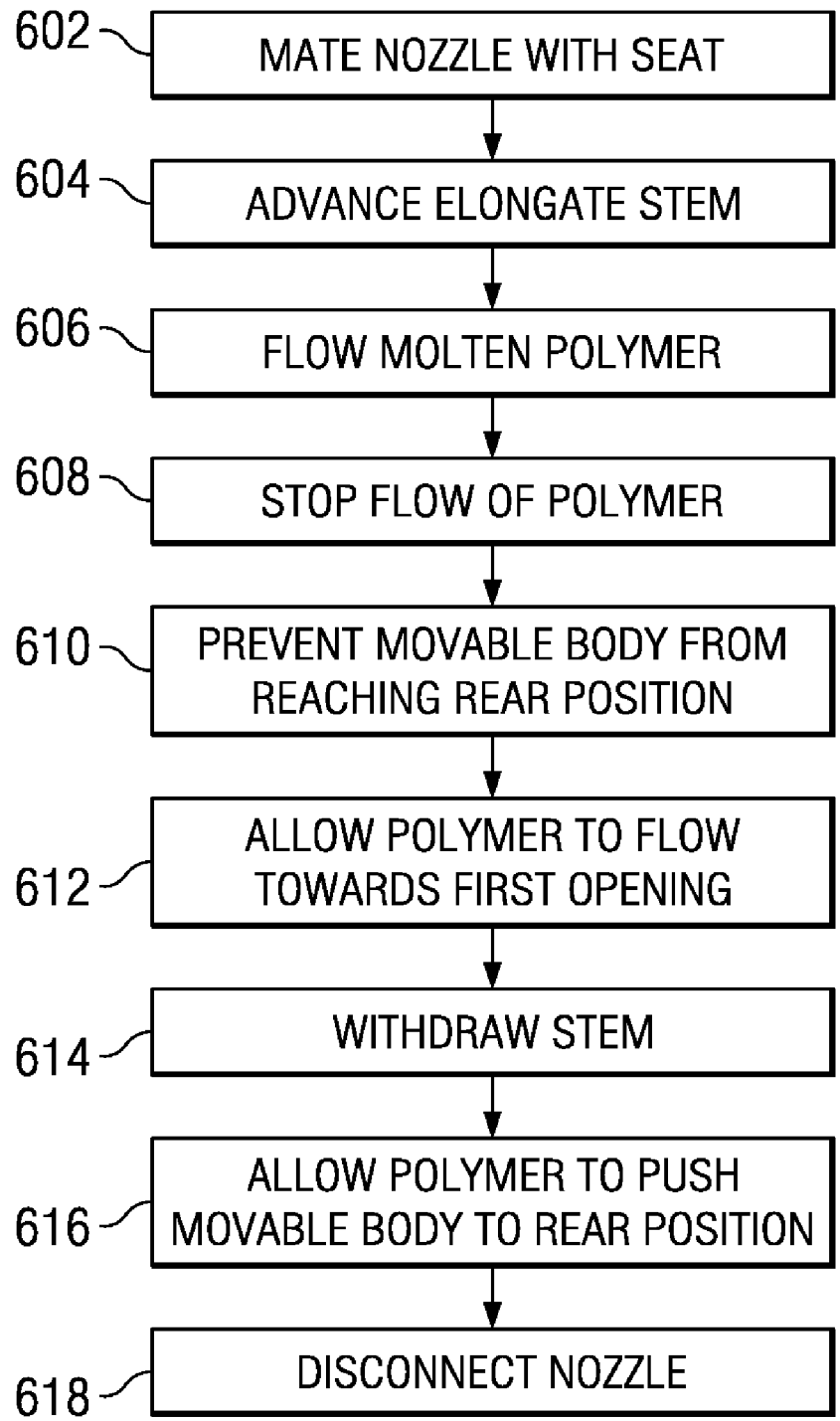
FIG. 6 is a flow diagram showing a method for connecting and disconnecting an injection molding machine to and from a shutoff assembly.

Referring to FIG. 6, in another aspect of the invention, a method for connecting and disconnecting an injection molding machine to and from a shutoff assembly includes the steps of mating (602) a nozzle of the injection molding machine to a seat in an exterior wall of a chamber of a shutoff assembly. The seat is in fluid communication with the chamber through a first opening extending from the exterior wall to an interior entry wall of the chamber. The interior entry wall has a first sealing surface around the first opening.

An elongate stem of the nozzle is advanced (604) through the first opening into the chamber. The stem may be fixed to the nozzle or may be retracted to and from an advanced position as desired by the user. Thus, the stem may be advanced into the first opening after or concurrently with the step of mating the nozzle to the seat. Similarly, the stem may be removed from the first opening before or concurrently with the step of disconnecting the nozzle from the seat.

Molten polymer then flows (606) through the first opening through channels 402 to the second opening in an interior exit wall of the chamber and then to one or more sprue bars or molds in fluid communication with the second opening. The molten polymer may flow around a small-diameter stem into the chamber or, alternatively, through one or more channels in the stem such as channels 302. Preferably, the molten polymer then flows around the movable body through one or more channels 402 that provide fluid communication between the first and second openings when the movable body is in the forward position.

At the conclusion of injecting polymer into a mold cavity, the injection molding system is then decompressed by stopping (608) the flow of the molten polymer through the first opening. The movable body is prevented (610) by the stem 124 from reaching a rear position where a second sealing surface of the movable body 116 seals to the first sealing surface of the chamber wall. Instead, the movable body is maintained in a forward position where the first and second sealing surfaces are spaced from each other and molten polymer is allowed (612) to flow in the direction from the second opening, around the movable body, and toward the first opening.

The injection molding machine is disconnected from the assembly by withdrawing (614) the stem of the nozzle from the chamber through the first opening. Molten polymer downstream of the movable body is allowed (616) to push the second sealing surface of the movable body 116 into sealing engagement with the first sealing surface formed in the interior entry wall. Preferably, no spring, incline, or decline is used to bias the movable body in either the forward or rear positions. The nozzle is then disconnected (618) from the seat in the exterior wall of the chamber. As discussed previously, the stem may be removed from the first opening before or concurrently with the step of disconnecting the nozzle from the seat.

In summary, the method and assemblies described herein decrease material loss due to drooling, increase reliability, and lower maintenance costs. They may be used anywhere a shutoff for molten polymer is required including, but not limited to sprue bars, hot runners, cold runners, and plates.

While illustrated embodiments of the present invention have been described and illustrated in the appended drawings, the present invention is not limited thereto but only by the scope and spirit of the appended claims.

I claim:

1. An injection mold shutoff assembly comprising:
   an exterior seat of the assembly sealable to a nozzle of an injection molding machine which is spaced from the assembly when in a nonengaged position;
   a first opening providing fluid communication from the exterior seat to a chamber, through an entry wall of the chamber, a first sealing surface of the entry wall surrounding the first opening;
   a movable body reciprocally movable within the chamber from a rear position proximate to the entry wall to a forward position remote from the entry wall, the movable body having a second sealing surface sealable with the first sealing surface when the movable body is in the rear position;
   an exit wall of the chamber including a second opening formed therein and being in fluid communication with at least one receiving unit;
   a stem of the nozzle inserted through the first opening at or after the time that the nozzle is sealed to the exterior seat of the assembly, a forward end of the stem contacting the movable body so the stem prevents movement to the rear position;
   at least one passage of the chamber extending from the entry wall to the exit wall and adapted to transport molten polymer from the first opening to the second opening when the movable body is in the forward position; and
   the movable body returning to the rear position when the stem is withdrawn from the first opening, whereby the second sealing surface seals with the first sealing surface, closing the first opening.

2. The assembly of claim 1, wherein the chamber is formed by mating at least a first assembly piece and a second assembly piece.

3. The assembly of claim 1, wherein the movable body is an ellipsoid.

4. The assembly of claim 3, wherein the ellipsoid is a sphere.

5. The assembly of claim 1, wherein at least one channel formed in the stem permits the flow of polymer through the nozzle and into the chamber when the movable body is in the forward position.

6. The assembly of claim 1, further comprising a plurality of ridges in the chamber extending from the entry wall to the exit wall that constrain movement of the movable body along a path of motion.

7. The assembly of claim 6, further comprising at least one of a plurality of passages spaced from each other by the ridges, the passages providing fluid communication between the first opening and the second opening when the movable body is not in the rear position.

8. The assembly of claim 7, wherein the passages are circumferentially disposed around an axis defined by a path of motion taken by the movable body from the rear to the forward position.

9. The assembly of claim 6, wherein the path of motion is a straight line.

10. The assembly of claim 6, wherein the ridges are circumferentially disposed around an axis defined by the path of motion.

11. The assembly of claim 1, wherein the shutoff assembly does not comprise a spring, incline, or decline to bias the movable body to either the rear position or forward position.

12. The assembly of claim 1, wherein the stem of the injection molding machine nozzle is movable from a retracted position inside of the nozzle to an advanced position inside of the chamber, the stem of the nozzle advanceable into the chamber after the nozzle seals to the exterior seat of the assembly.

13. The assembly of claim 1, wherein the stem of the nozzle is fixed to a remainder thereof, the stem advancing into the chamber at the time the nozzle is mated to the exterior seat of the assembly.

14. The assembly of claim 1, wherein the at least one receiving unit is a sprue bar.

15. An injection mold shutoff assembly comprising:
   an exterior seat of the assembly sealable to an injection molding machine nozzle for introducing molten polymer, the nozzle being spaced from the assembly when in a nonengaged position;
   a first opening providing fluid communication from the exterior seat to a chamber, the chamber having an interior entry wall, a first sealing surface of the entry wall surrounding the first opening;
   a movable body reciprocally movable within the chamber from a rear position proximate to the entry wall to a forward position remote from the entry wall, the movable body having a second sealing surface sealable with the first sealing surface of the entry wall;
   an exit wall of the chamber including a second opening formed therein;
   at least one passage of the chamber extending from the entry wall to the exit wall and adapted to transport molten polymer from the first opening to the second opening when the movable body is in the forward position; and
   when the nozzle is in a nonengaged position, molten polymer downstream of the movable body pushes the movable body back to the rear position, thereby sealing the second sealing surface with the first sealing surface, closing the first opening.

16. The assembly of claim 15, wherein the chamber is formed by mating at least a first assembly piece and a second assembly piece.

17. The assembly of claim 15, wherein the shutoff assembly does not comprise a spring, incline, or decline to bias the movable body to either the rear position or forward position.

18. The assembly of claim 15, wherein the movable body is an ellipsoid.

19. The assembly of claim 18, wherein the ellipsoid is a sphere.

20. The assembly of claim 15, further comprising a plurality of ridges formed in the chamber and extending from the entry wall to the exit wall, the ridges constraining movement of the movable body to a path of motion.

21. The assembly of claim 20, wherein the path of motion is a straight line.

22. The assembly of claim 20, wherein the ridges are circumferentially disposed around an axis defined by the path of motion.

23. The assembly of claim 20, further comprising at least one of a plurality of passages spaced from each other by the ridges, the passages permitting the flow of molten polymer from the first opening of the chamber to the second opening thereof when the movable body is in the forward position, the passages sealed from the first opening when the movable body is in the rear position.

24. The assembly of claim 23, wherein the passages are circumferentially disposed around an axis defined by the path of motion.

* * * * *